2 Sheets—Sheet 1

I. COGSWELL, Jr.

Assignor, by mesne assignments, to O. B. NORTH & Co.

Carriage Top.

No. 8,151. Reissued April 2, 1878.

Witnesses.

J. H. Chumray

H. A. Wilson.

Ira Cogswell Jr.
Inventor
By atty.

Thos. E. Tinsle

N. PETERS, PHOTO-LITHOGRAPHER, WASHINGTON, D. C.

I. COGSWELL, Jr.

Assignor, by mesne assignments, to O. B. NORTH & Co.

Carriage Top.

No. 8,151. Reissued April 2, 1878.

Witnesses:
J. H. Shumway
J. H. Nelson

Ira Cogswell Jr.
Inventor
By Atty.
Wm. E. Earle

N. PETERS, PHOTO-LITHOGRAPHER, WASHINGTON, D. C.

UNITED STATES PATENT OFFICE.

IRA COGSWELL, JR., OF ENGLEWOOD, ILLINOIS, ASSIGNOR, BY MESNE ASSIGNMENTS, TO O. B. NORTH & CO., OF NEW HAVEN, CONNECTICUT.

IMPROVEMENT IN CARRIAGE-TOPS.

Specification forming part of Letters Patent No. 37,734, dated February 24, 1863; Reissue No. 8,151, dated April 2, 1878; application filed March 4, 1878.

*To all whom it may concern:*

Be it known that I, IRA COGSWELL, Jr., of Englewood, in the county of Cook and State of Illinois, have invented a new Improvement in Top-Carriages; and I do hereby declare the following, when taken in connection with the accompanying drawings and the letters of reference marked thereon, to be a full, clear, and exact description of the same, and which said drawings constitute part of this specification, and represent, in—

Figure 1:
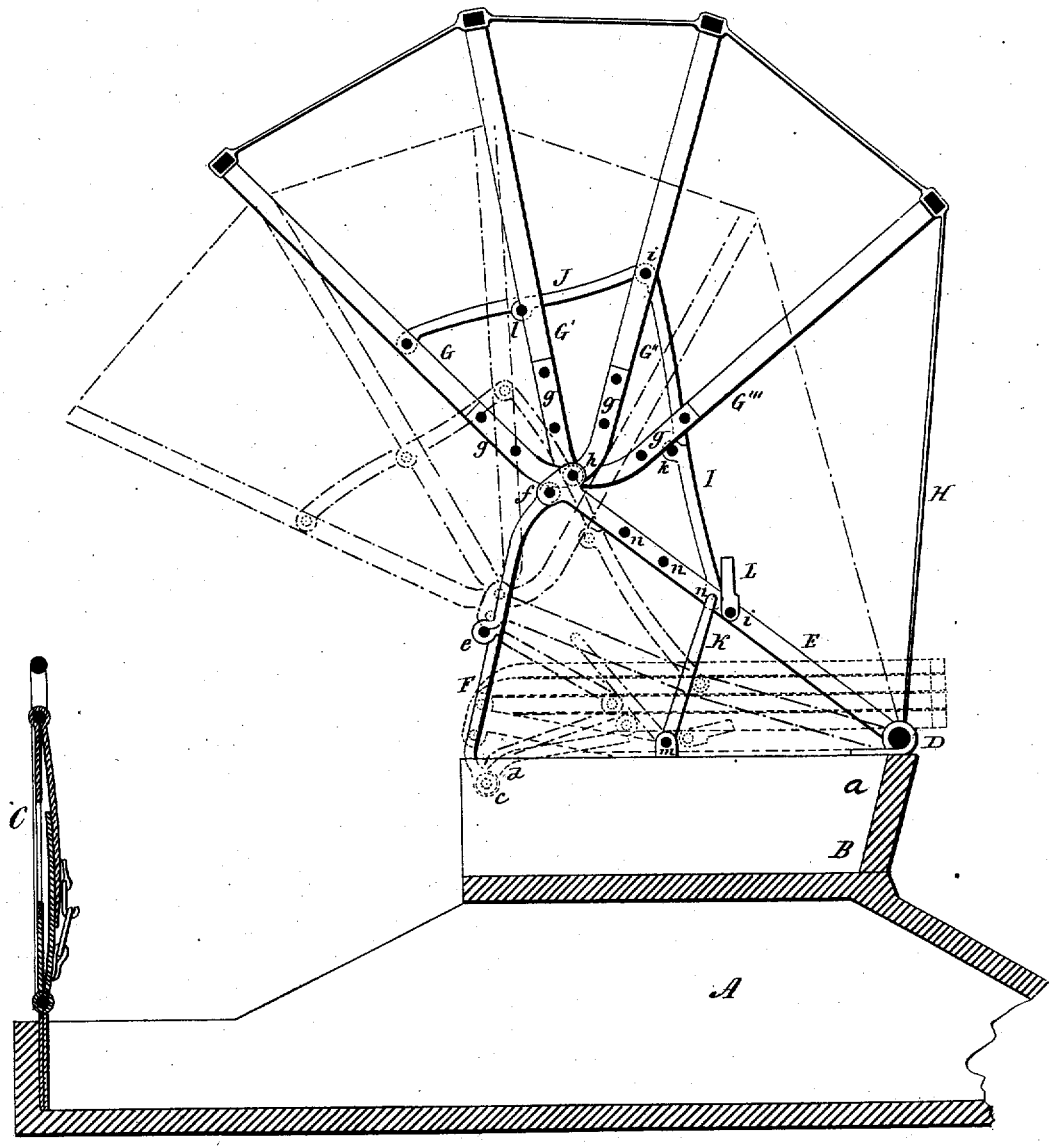
Figure 2:
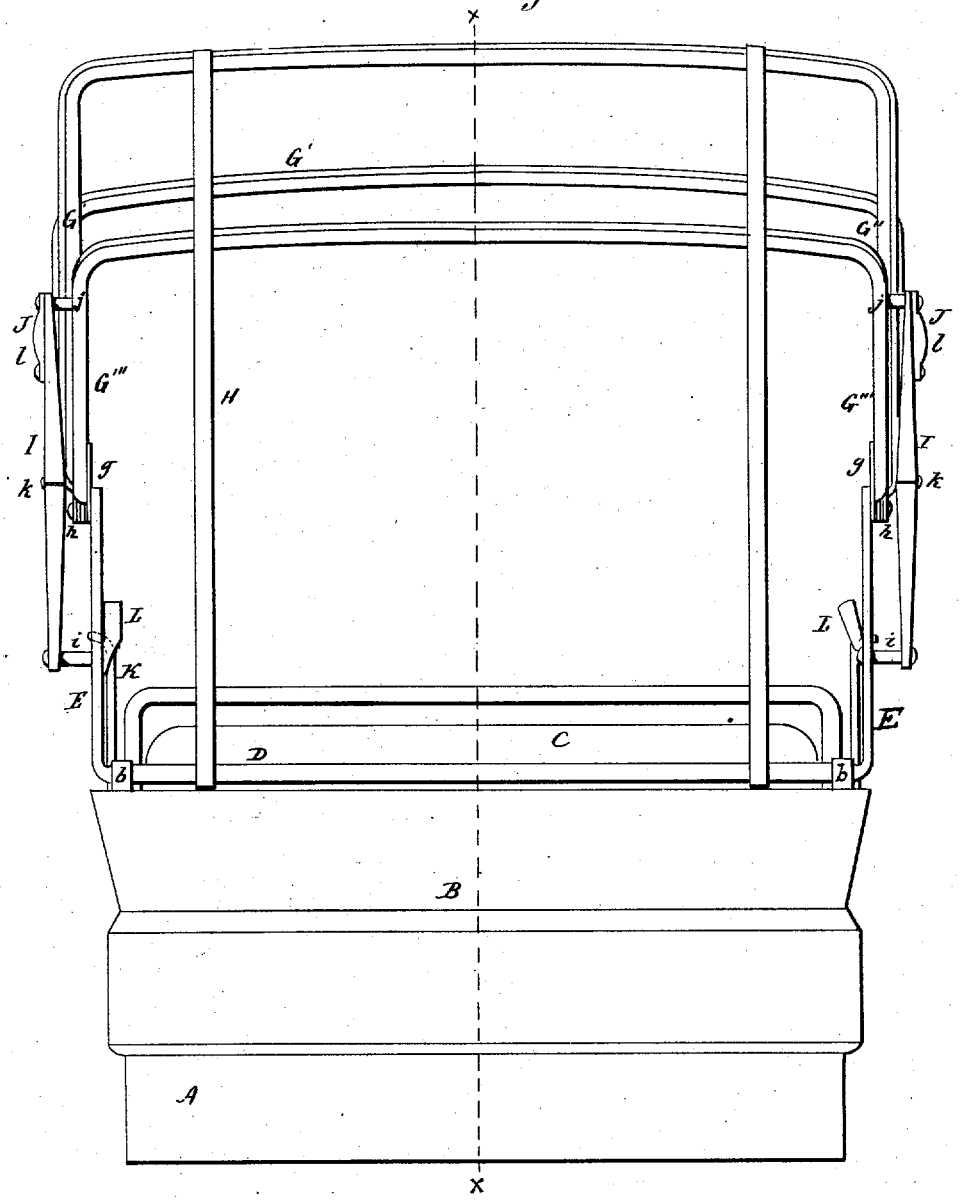

Figure 1, vertical central section; Fig. 2, rear view.

This invention relates to an improvement in top-carriages, the object being to construct the top so that it may be turned forward from its up or normal condition to better protect the occupant of the carriage in front than the top in its normal condition is capable of doing, and also to construct the top so that it may be collapsed into a more compact form than the usual construction; and the invention consists in hinging the top to the body, so that it may be dropped or turned downward forward of the seat, or adjusted to an upright position, and locked at any of its adjusted positions; and also in the details of construction, as hereinafter described, and more particularly recited in the claims.

A represents the body of a light wagon; B, the seat, and C the dash-board. These parts may be constructed in the usual way, and therefore do not require a minute description.

On the upper part of the back *a* of the seat is placed a rod or shaft, D, which is fitted in suitable bearings *b b*, and allowed to turn freely therein, and form the hinge on which the top will turn for adjustment, as hereinafter described. The ends of the shaft D are bent so as to form arms E E, which are at right angles to the shaft D and parallel with the sides of the body A. The front ends of these arms E E are connected by jointed bars F F with the front parts of the sides *c* of the seat B, the lower ends of the bars F being connected to the sides of the seat by pivot-bolts *d*. The bars F are jointed at about their centers, the joints *e* being so formed as to admit of said bars folding backward. The upper ends of the bars F are attached to the front ends of the arms E by pivot-bolts *f*.

G G′ G″ G‴ represent the bows, which may be constructed of wood, and in the same manner as the bows of an ordinary folding carriage or wagon top. The lower ends of these bows are provided with irons *g*, all of which, at each side of the top, are fitted on a common pivot or bolt, *h*, and these bolts pass through the front end of the arm E. The bows form the frame of the top, and they have straps H attached to them, to prevent them spreading beyond a certain distance from each other. These straps at their back ends are attached to the shaft D.

I I represent the two parts of a jointed brace, the lower ends of which are connected by pivot-bolts *i i* with the arms E E, the upper ends of said braces being connected by pivot-bolts *j j* with the bow G″. The joints *k* of the braces I are so formed that said braces may fold backward. The bows G″ and G are connected at each side by a jointed brace, J J, the joints *l* of said braces being so formed as to admit of the braces J folding upward.

From the above description it will be seen that, by folding the braces I I backward and folding the braces J J upward, the bows G G′ G″ G‴ may be brought in contact with each other, and turned down parallel with the arms E E, and that the latter, by folding back the bars F F, may be let down upon the sides of the seat B, as shown in broken lines, Fig. 1. When the top is in this position it does not form any encumbrance whatever, and the view from the seat is unobstructed all around, equally so as if the seat were not provided with a top.

In order to raise the top, the arms E E are first lifted, as shown in Fig. 1, the bars F supporting the same, and the bows G G′ G″ G‴ are then spread out, the jointed braces I I J J retaining them in proper position.

If it should be necessary for the occupant of the seat to be better protected in front than the top in its up or normal position is capable of doing, the bars F F are folded backward, and hooks K, which are attached to each side of the seat by joints or pivots *m*, are fitted in any of a series of holes, *n*, in the arms E E. By this arrangement the front part of the top may be dropped or adjusted more or less forward, as shown in broken lines, Fig. 1, and locked in any such adjusted position by the locking device.

The bows or frame of the top may be covered in the usual manner, and the lower ends of the jointed bars I I may be provided with levers L, to admit of said bars being manipulated at the inner sides of the top.

By this invention a strong and durable top is obtained, one that will be firm or not liable to rattle, and, on account of the comparatively great scope of its adjustment, far preferable to the ordinary tops in use.

Having thus described my invention, what I claim as new, and desire to secure by Letters Patent, is—

1. A carriage-top hinged to the body, substantially as described, so as to be dropped forward of the seat, and combined with a device to hold it in upright or intermediate positions, substantially as described.

2. The combination of the inclined arms E E, hooks K, and folding bars F F with the bars I J, bows G G′ G″ G‴, and seat B, all in the manner herein shown and described.

IRA COGSWELL, JR.

Witnesses:

HUGH T. BIRCH,
THOMAS J. DIVEN.